United States Patent [19]
Shryock

[11] Patent Number: 6,059,375
[45] Date of Patent: May 9, 2000

[54] UNIVERSAL MOUNT FOR TIRE RIMS

[76] Inventor: John A. Shryock, 2007 Thornbush Pl., Brandon, Fla. 33511

[21] Appl. No.: 09/263,345

[22] Filed: Mar. 5, 1999

Related U.S. Application Data

[63] Continuation-in-part of application No. 09/193,178, Nov. 16, 1998.

[51] Int. Cl.$^7$ ....................................................... B60B 7/10
[52] U.S. Cl. .................................... 301/37.34; 301/37.42; 301/37.1
[58] Field of Search ................................ 301/37.1, 37.31, 301/37.42, 37.34, 108.4, 37.35, 37.36, 37.37

[56] References Cited

U.S. PATENT DOCUMENTS

| | | | |
|---|---|---|---|
| 1,390,425 | 9/1921 | Blair | 301/37.1 |
| 2,561,160 | 7/1951 | Weasler | 301/37.34 |
| 2,722,460 | 12/1955 | Dieterich . | |
| 2,827,332 | 3/1958 | Chamberlin | 301/37.34 |
| 3,036,867 | 5/1962 | Lyon . | |
| 3,389,937 | 6/1968 | Brumfield . | |
| 4,229,047 | 10/1980 | Beisch | 301/37.1 |
| 4,596,425 | 6/1986 | Hung | 301/37.42 |
| 4,735,460 | 4/1988 | Tomida et al. | 301/37.1 |
| 4,822,109 | 4/1989 | Feria | 301/37.35 |
| 5,042,881 | 8/1991 | Polka . | |
| 5,490,342 | 2/1996 | Rutterman et al. . | |
| 5,623,777 | 4/1997 | Hsiao et al. . | |
| 5,659,989 | 8/1997 | Hsiao et al. . | |
| 5,718,484 | 2/1998 | Sheu | 301/37.33 |

FOREIGN PATENT DOCUMENTS

| | | |
|---|---|---|
| 215583 | 3/1958 | Australia . |
| 0 187 228 | 11/1985 | European Pat. Off. . |
| 462025 | 2/1937 | United Kingdom . |

*Primary Examiner*—Mark T. Le
*Assistant Examiner*—Long Bao Nguyen
*Attorney, Agent, or Firm*—Larson & Larson, P.A.; James E. Larson

[57] ABSTRACT

A universal mount for tire rims includes a plurality of clips mounted on the inside periphery of a wheel cover. An alternate first type of clip is a clip member mounted in a clip housing and spring loaded with an arcuate proximal termination portion designed to fit over a peripheral surface on a wheel. Opposite vertical spaced apart channels contain coil springs. As the clip member is raised, the springs are compressed and assist in holding the proximal portion over a wheel rim. In a second type of clip, the arcuate proximal termination portion has a vertical wall attached at right angles to a plate that contains a threaded screw. A lower portion of the clip member has a pair of feet that can press down on a pair of coil springs in a pair of vertical chambers. The threaded screw prevents free vertical movements of the clip member. The second alternate type of clip is used to positively lock a wheel cover over a peripheral surface of a wheel rim.

5 Claims, 8 Drawing Sheets

UNIVERSAL MOUNT FOR TIRE RIMS

PREVIOUS APPLICATION

This application is a continuation-in-part from application Ser. No. 09/193,178, filed Nov. 16, 1998 (co-pending).

BACKGROUND OF THE INVENTION

This invention relates to hub caps and mounts attached to tire rims. More particularly, it refers to a universal mount for attachment to tire rims. The mount is intended to be installed on a hubcap so that the hubcap can be removably affixed to any type of wheel rim. Hubcaps are well known vehicle accessories that are typically installed on a wheel to which a tire is mounted for aesthetic purposes, particularly to shield or hide the threaded nuts holding the wheel on the vehicle axle and also because the middle of a typical wheel is not aesthetically pleasing.

Figure 1:
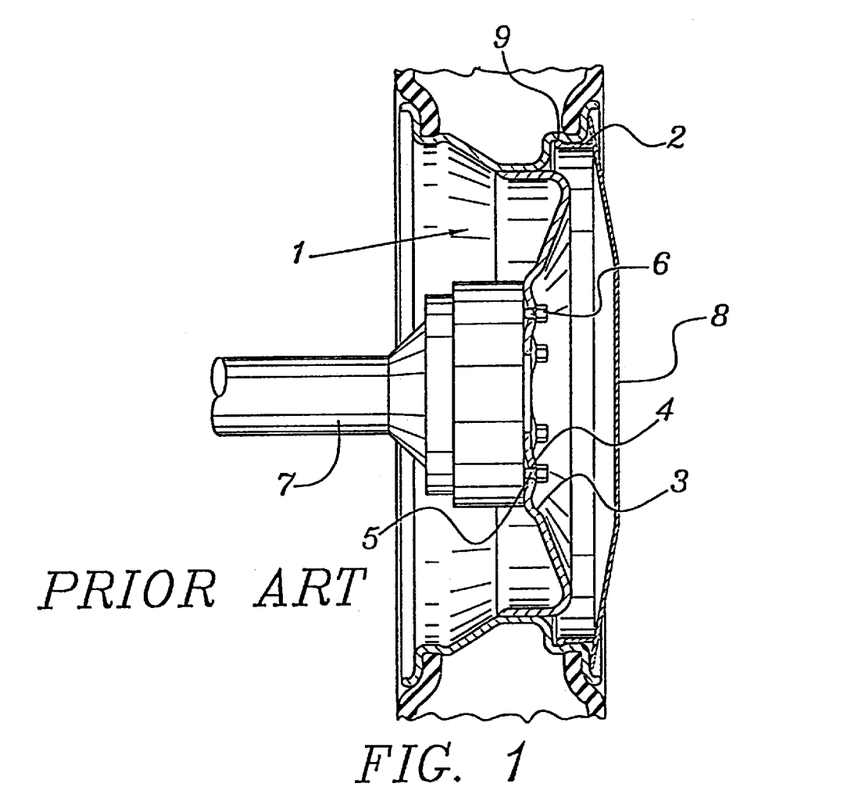
FIG. 1 shows a cross-sectional view of a prior art configuration of a vehicle axle, wheel and full wheel cover.

The typical hubcap is installed on the typical wheel through an interference fit between a peripheral rim of the hubcap and a peripheral surface of the wheel. FIG. 1 depicts a typical prior art situation wherein a wheel 1 includes a peripheral surface 2 as well as a central surface 3 having openings 4 through which wheel mounting bolts 5 protrude with threaded nuts 6 threaded onto the bolts 5 to hold the wheel on the axle 7 of the associated vehicle. A prior art hubcap 8 has a peripheral axially extending portion 9 that engages the surface 2 of the wheel 1 in an interference fit. As should be understood from FIG. 1, the hubcap 8 is specifically sized and configured so that it only may be removably affixed to a wheel such as the wheel 1 having the particular surface 2 incorporated therewith. Unless the wheel 1 has the configuration shown in FIG. 1, the hubcap 8 may not be installed thereon.

A need has developed for a universal mount that will enable a hubcap to be affixed to any one of a number of configurations of wheels including MAG wheels. It is with this need in mind that the present invention was developed.

The following prior art is known to Applicant:

U.S. Pat. No. 2,722,460 to Dieterich discloses a fastening device for spoke simulating shrouds that includes a clip surrounding a peripheral ring on a hubcap and a further clip having a distal end affixed to a surface of a wheel with the further clip attached to the first-mentioned clip by a screw extending through an opening in the further clip and threadably attached to the first-mentioned clip. The present invention differs from the teachings of Dieterich as contemplating two types of clips, one that is spring loaded in a holder and the other of which may be tightened down through the use of a threaded screw.

U.S. Pat. No. 3,389,937 to Brumfield discloses a wheel cover having a plurality of peripherally spaced clips to affix the wheel cover to a wheel. The present invention differs from the teachings of Brumfield as contemplating means for adjusting the position of each clip and allowing them to accommodate to wheels of differing dimensions.

Applicant is also aware of U.S. Pat. No. 5,659,989 to Hsiao et al. Hsiao et al. disclose a wheel cover having a peripheral configuration similar to that which is depicted in prior art FIG. 1 herein. The present invention may be employed as a modification to a wheel cover such as that which is disclosed by Hsiao et al. to adapt the Hsiao et al. wheel cover to wheels of differing dimensions.

SUMMARY OF THE INVENTION

The present invention relates to a universal mount for tire rims. The present invention includes the following interrelated objects, aspects and features:

(1) In a first aspect, the present invention includes a plurality of clips mounted peripherally of a wheel cover. Any number of such clips, as desired, may be mounted about the periphery of a wheel cover although four, six or eight such clips are the preferred numbers.

(2) In any event, whether four, six or eight clips are employed, in the preferred embodiment, clips of two differing types can be employed.

(3) A first alternate type of clip employed is a clip member mounted in a clip housing. The clip member has a distal end with an arcuate termination designed to fit over a peripheral surface on a wheel. The proximal end of the clip member has a pair of feet supporting a resilient member on each foot. A rectangular top cover portion of the housing has a threaded screw that projects downwardly through the cover to a position between the two resilient members and threadably engages a nut to hold the cover portion and the resilient members in place. By lifting the distal end of the clip the resilient members are compressed while the clip is fastened over the wheel rim. The resilient pressure retains the clip over the wheel rim. These resilient members provide a means for maintaining and balancing the position of the proximal end of the clip member but allow it to freely move up and down against the force of the springs in each direction. This action allows the vertical (and radial) position of the clip member to easily be adjusted to accommodate to peripheral surfaces on wheel rims of differing configurations.

(4) A second alternate type of clip is similar to the first type of clip. The proximal arcuate portion mounts over the tire rim. A vertical wall separates the arcuate portion from a pair of distal feet with each foot compressing a resilient member mounted in a separate vertical chamber. The amount of resilient member compression depends on the distance a threaded screw is threaded into a nut. The screw causes a top plate to move up or down as the screw is moved threadably on the nut which is mounted into side surface of a wall separating the vertical chambers. Screwing down on the screw causes the resilient members to be compressed so the proximal arcuate portion of the clip can be mounted tightly on the tire rim. By moving the screw upward the clip releases pressure on the wheel rim caused by the compressive force of the resilient members.

(5) In operation, in the preferred embodiment, a wheel cover has several clips of either the first or second alternate types mounted thereon.

Accordingly, it is a first object of the present invention to provide a universal mount for tire rims.

It is a further object of the present invention to provide such a device wherein clips of either the first or second alternate types are mounted about the periphery of a wheel cover.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 2:
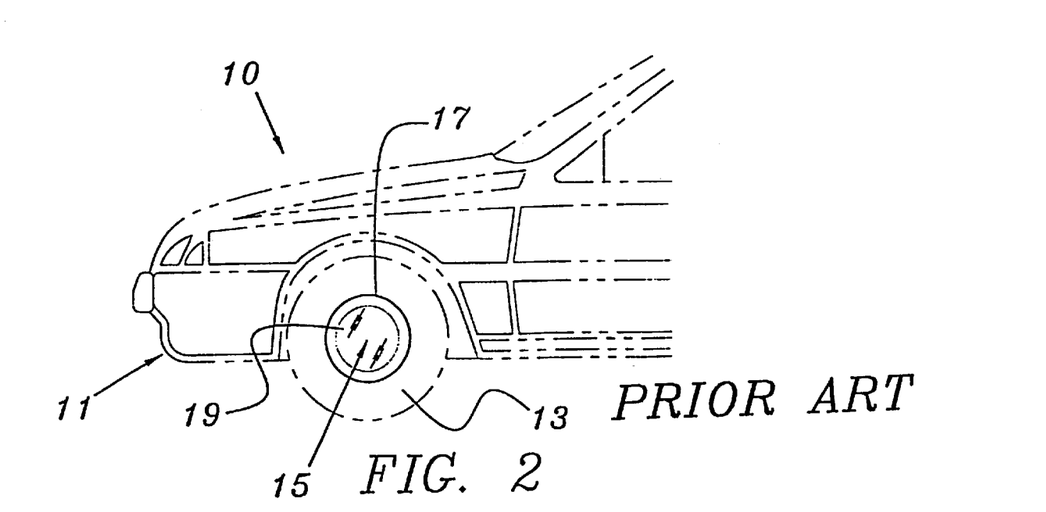
FIG. 2 shows a side view of a full wheel cover as mounted over a wheel rim of a typical automobile with the typical automobile shown in phantom.

FIG. 2 shows the front end 11 of an automobile 10 having a tire 13 mounted on a wheel (not shown) with a wheel cover 15 mounted thereover. The wheel cover 15 has a periphery 17 and a central portion 19 that may be flat or domed or may be of any other desired aesthetic configuration.

Figure 3:
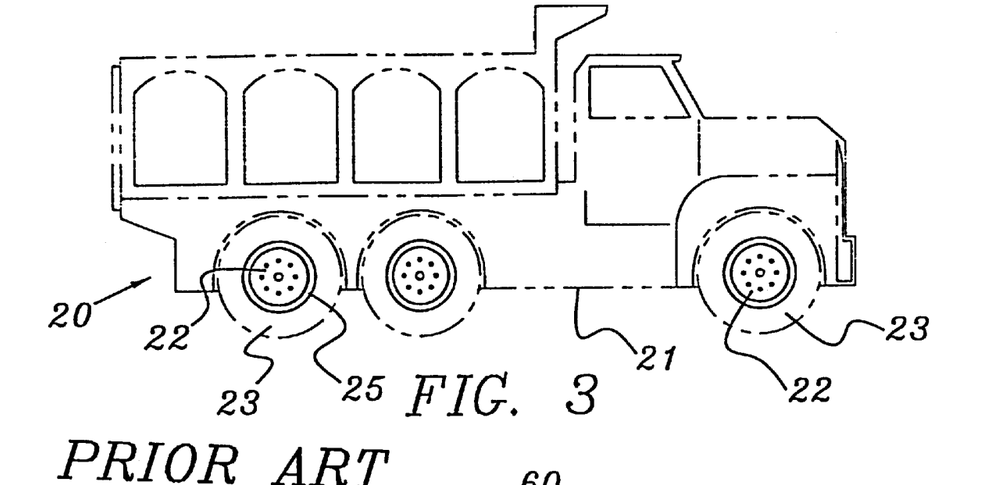
FIG. 3 shows a side view of a truck (in phantom) with wheel rings mounted over the wheel rims thereof.

FIG. 3 shows a truck 20 having a body 21 and a plurality of tires 23 mounted on wheels 22 and with a wheel ring 25 mounted about the periphery of each wheel 22.

Figure 4:
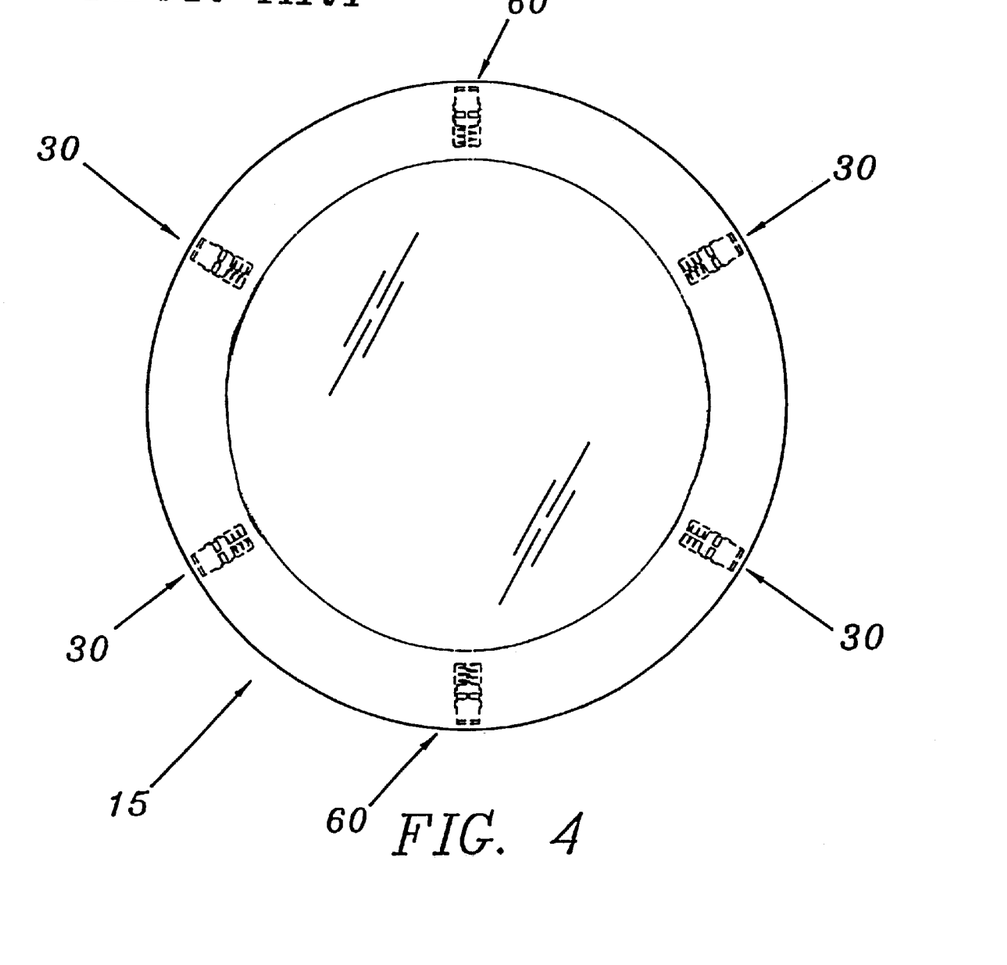
FIG. 4 shows a front view of a full wheel cover having six clips in accordance with the teachings of co-pending Ser. No. 09/193,178, mounted thereon in peripherally spaced configuration.

FIG. 4 shows a wheel cover 15 such as is depicted in FIG. 2 having a plurality of clips 30, 60 mounted thereon with the reference numeral 30 referring to clips of a first type and with the reference numeral 60 depicting clips of a second type. In one alternative, two clips 60 are shown diametrically opposed with four clips 30 also included to either side of the clips 60.

Figure 5:
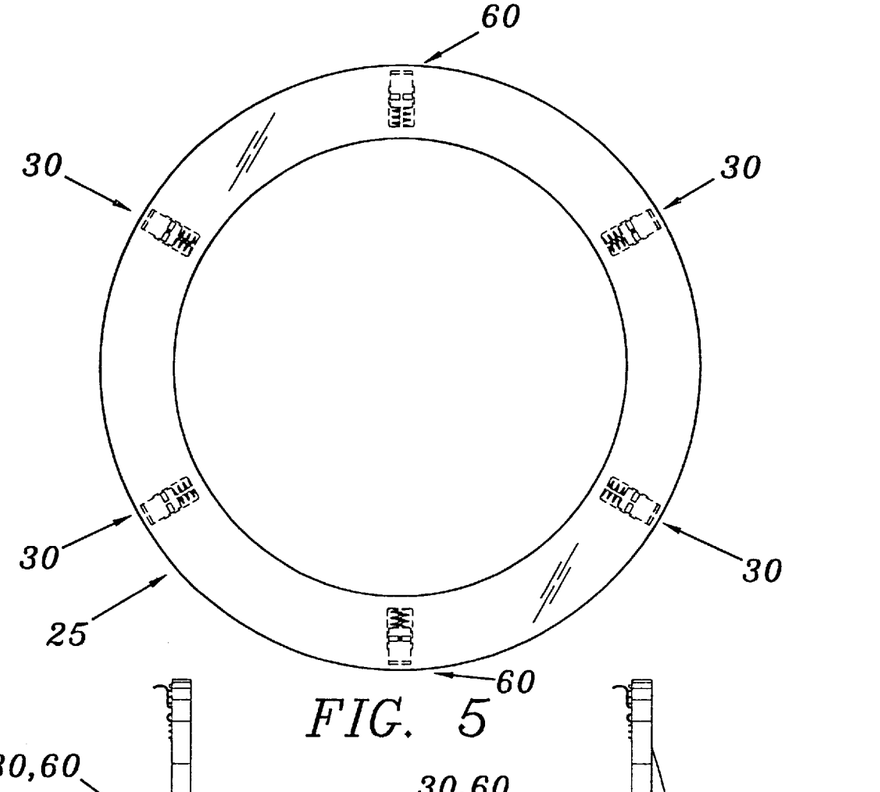
FIG. 5 shows a front view of a wheel ring with six clips in accordance with the teachings of co-pending Ser. No. 09/193,178 mounted thereon in peripherally spaced configuration.

FIG. 5 shows a wheel ring 25 such as is shown in FIG. 3 and with a plurality of clips 30, 60 mounted peripherally therearound. In one alternative, two clips 60 are shown diametrically opposed with four clips 30 also included to either side of the clips 60.

Figure 6:
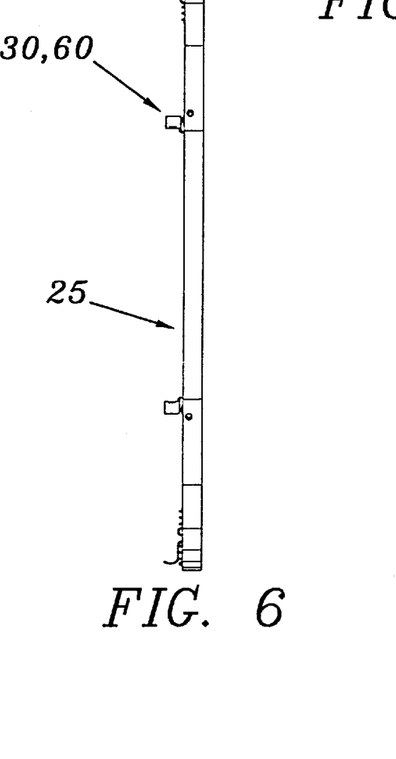
FIG. 6 shows a side view of the wheel ring of FIG. 5.

FIG. 6 shows the wheel ring 25 of FIG. 5 from a side view showing the manner by which the clips 30, 60 protrude inwardly in the view of FIG. 5 to engage peripheral surfaces of a wheel rim. The wheel rim 25 can have an increased thickness where the clip attaches to the ring in order to accommodate wheel center portion protrusions.

Figure 7:
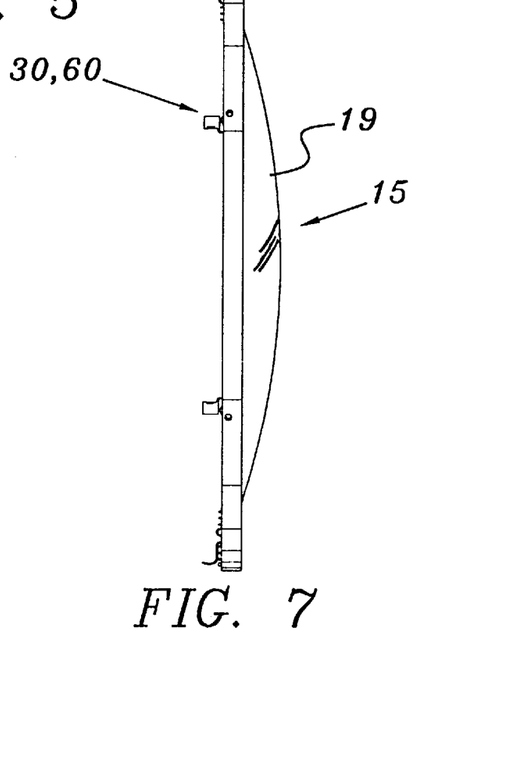
FIG. 7 shows a side view of the wheel cover of FIG. 4.

FIG. 7 shows a side view of the wheel cover 15 also depicted in FIGS. 2 and 4 and with a domed central portion 19 and showing the clips 30, 60 protruding inwardly.

Figure 8:
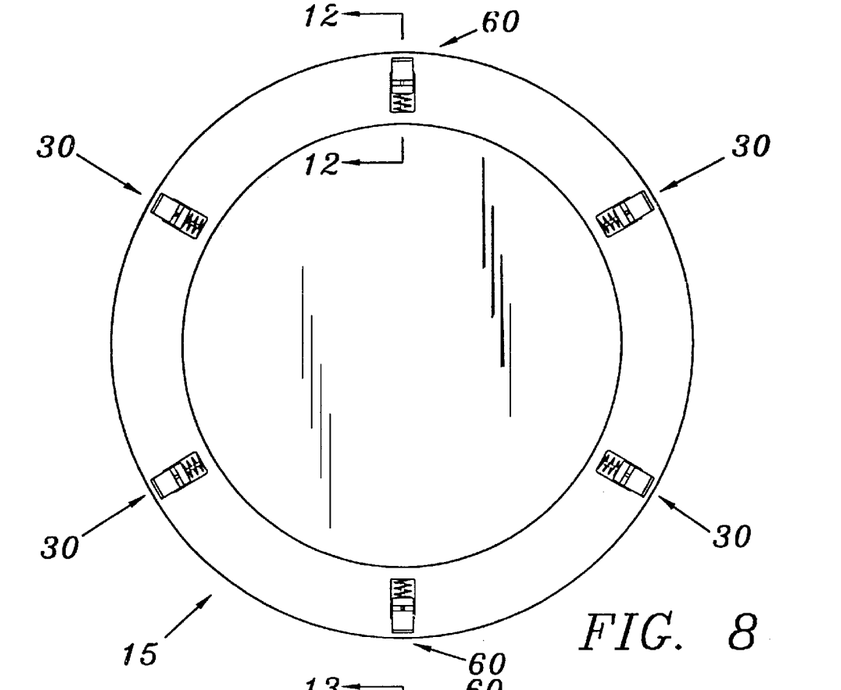
FIG. 8 shows a rear view of the wheel cover of FIG. 4 showing inclusion of six clips.

FIG. 8 shows a rear view of the wheel cover 15 showing more clearly the clips 30 and 60.

Figure 9:
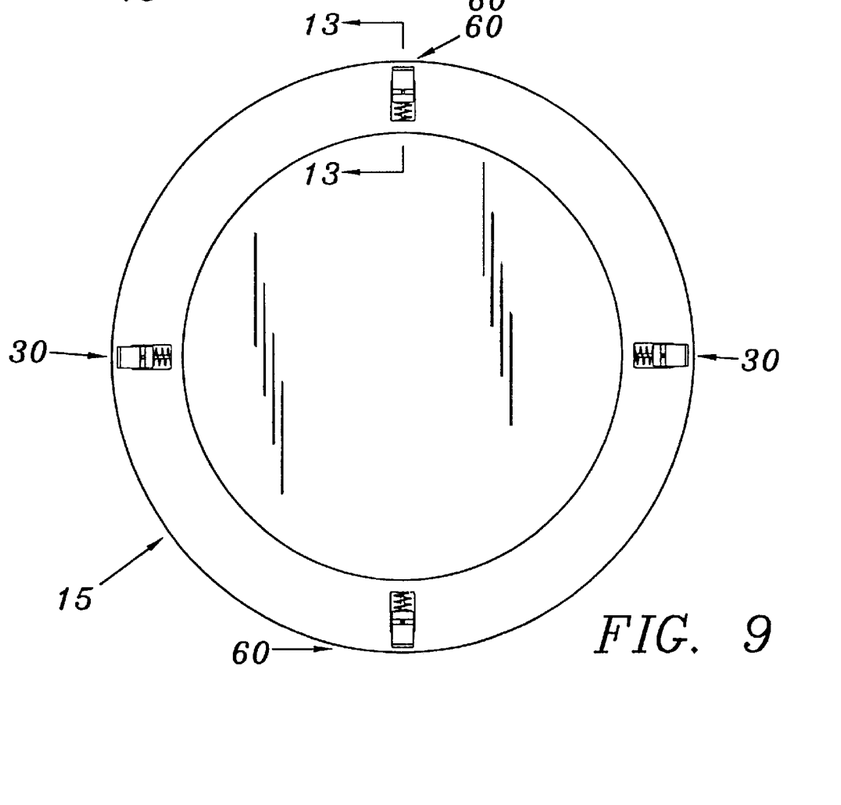
FIG. 9 shows a rear view of the wheel cover of FIG. 4 but with four clips mounted thereon.

FIG. 9 shows the wheel cover 15 but modified so that it only includes four clips, for example, two diametrically opposed clips 30, and two diametrically opposed clips 60.

Figures 10, 11:
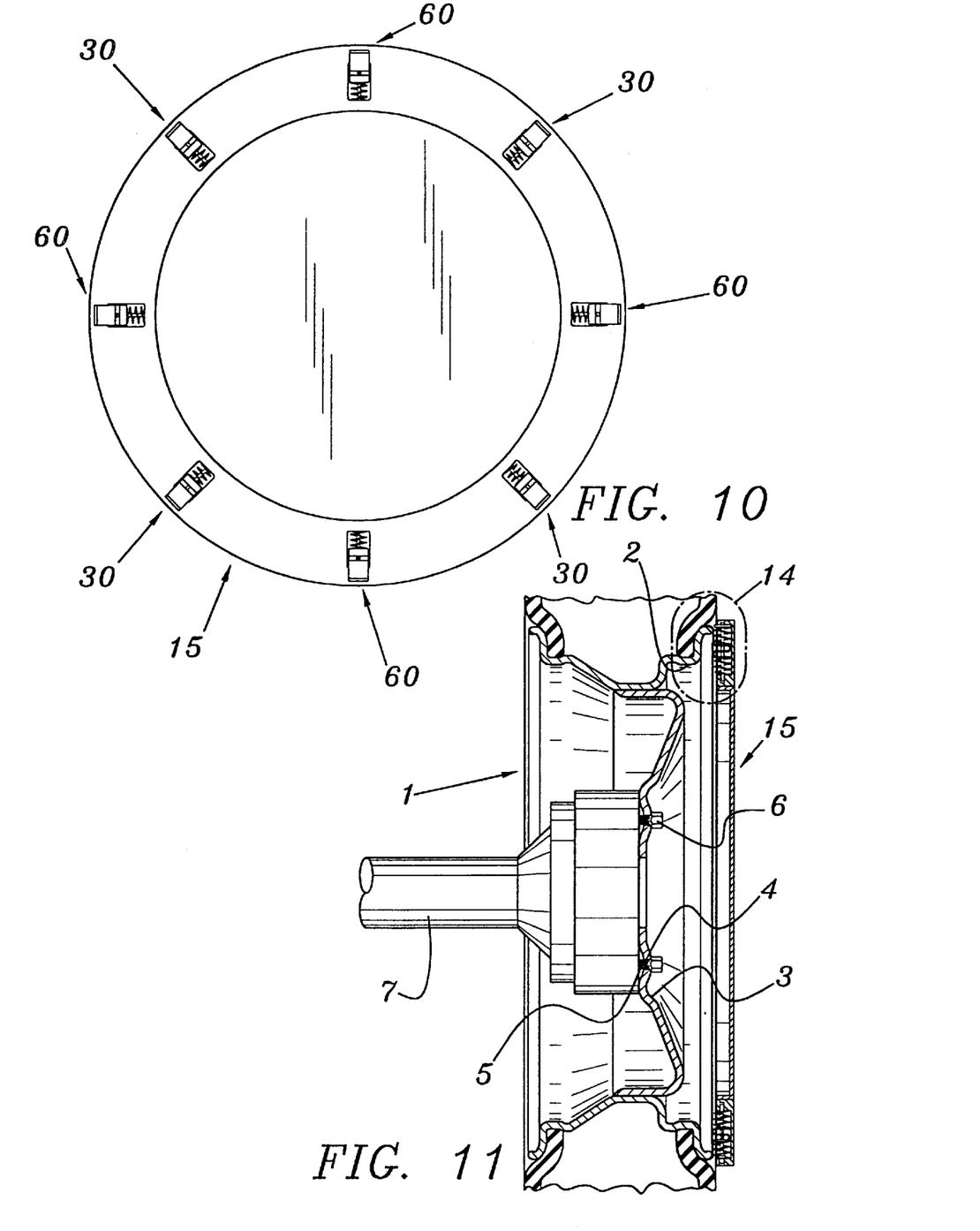
FIG. 10 shows a rear view of the wheel cover of FIG. 4 but with eight clips mounted thereon.
FIG. 11 shows a cross-sectional view similar to that of the prior art view of FIG. 1 but depicting a wheel cover with a plurality of clips in accordance with the teachings of co-pending Ser. No. 09/193,178 mounted thereon.
Figure 12:
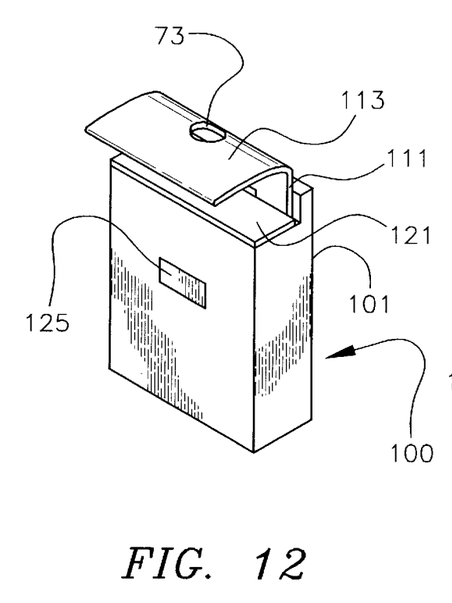
FIG. 12 shows a clip of a first alternate type in accordance with the teachings of the present invention.
Figure 13:
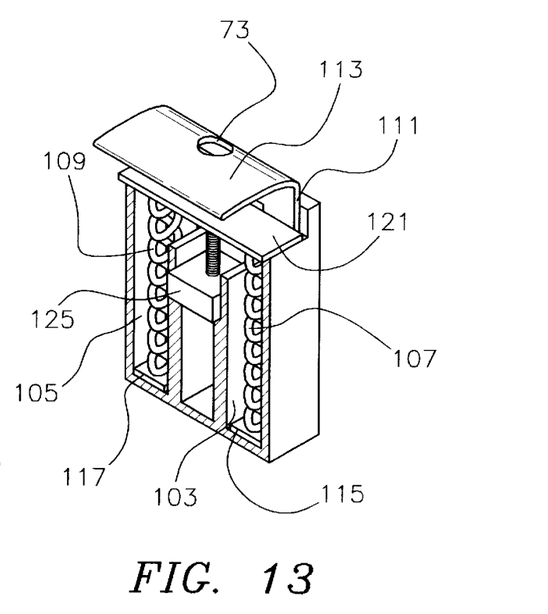
FIG. 13 shows a clip of the first alternate type with its front cover removed and in a resting mode.
Figure 14:
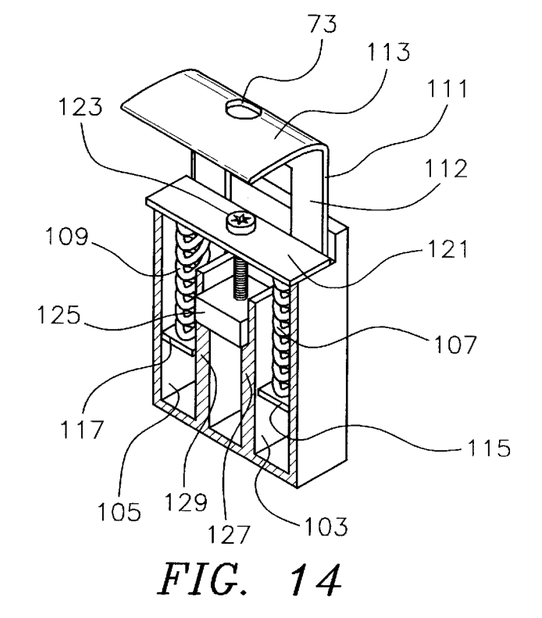
FIG. 14 shows the clip of FIG. 13 with springs compressed.

FIG. 10 shows a further alternative wherein the wheel cover 15 includes eight clips including, for example, four clips 30 and four clips 60.

Of course, in describing the locations of the clips 30, 60 in the various configurations of wheel covers and clips described hereinabove, the descriptions of the particular locations of the various clips 30, 60 should be considered merely exemplary. Any desired combination of the types of clips 30, 60 may be employed. In fact, it may be advantageous to only use one clip 60 with the rest of the clips being of the type designated by the reference numeral 30. Alternatively, if desired, all of the clips employed may be of the type designated by the reference numeral 60 or the reference numeral 30, as desired. In the same manner, alternate clips 100 or 130 can be substituted for the clips 30 or 60 set forth above.

Figure 15:
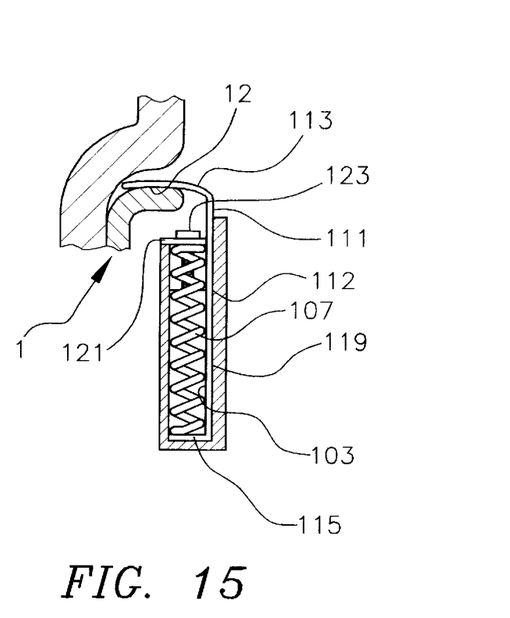
FIG. 15 shows a cross-sectional side elevational view of the clip of FIG. 13.
Figure 19:
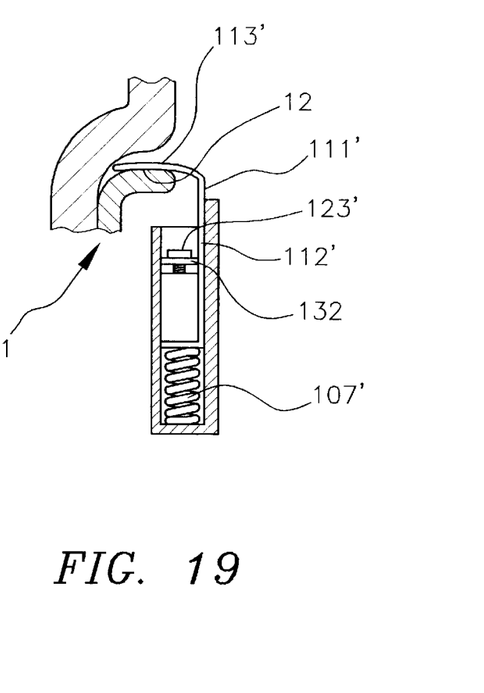
FIG. 19 shows a cross-sectional side elevational view of the clip of FIG. 18.

FIG. 11 shows a view similar to that of FIG. 1 including depiction of a wheel 1 having a peripheral surface 2 that was used by the wheel cover 8 with its annular protrusion 9. With reference, also, to FIGS. 15 and 19, it is seen that the wheel 1 also has a peripheral surface 12 that is used in accordance with the teachings of the present invention (as will be described in greater detail hereinafter) to hold a wheel cover such as the wheel cover 15 thereon.

With reference to FIGS. 12 to 15, a first alternate type of clip is generally designated by the reference numeral 100 and is seen to include a clip housing 101. The housing 101 has a pair of vertical chambers 103 and 105 each containing a coil spring 107 and 109, respectively. A clip member 111 has an arcuate proximal portion 113 that fits over a peripheral surface 12 of a wheel rim 1, a pair of distal feet 115 and 117 that support coil springs 107 and 109 respectively, and a vertical portion 112. An upper plate 121 on the housing 101 is firmly held in place by a threaded screw 123 engaging a nut 125 mounted in the interior side walls 127 and 129 of the chambers 103 and 105, respectively. When the clip member 111 is raised the coils are compressed and arcuate proximal portion 113 engages the peripheral surface 12 of the wheel 1. The clip member 111 then is released to allow portion 113 to snap over surface 12 and hold the clip 100 in place.

Figure 18:
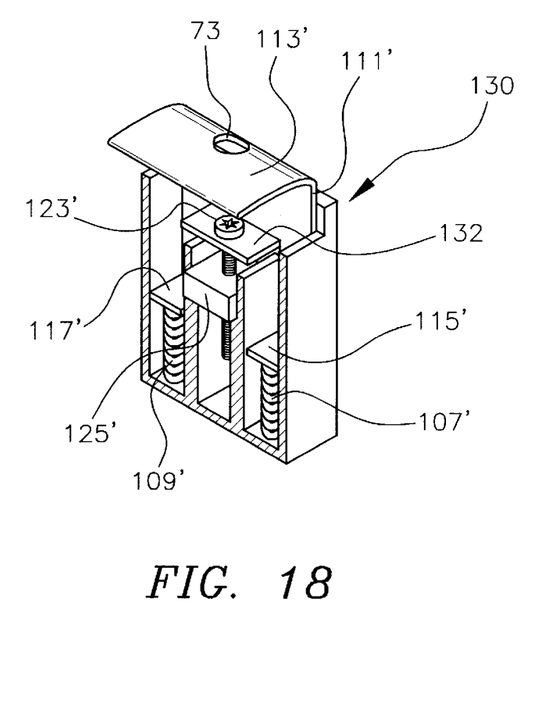
FIG. 18 shows a clip of FIG. 17 with the springs compressed.

FIGS. 16–19 show the second alternate type of clip 130. The clip 130 has many features that are the same as the features of the clip 100 and those features in common are designated in FIGS. 16–19 using like primed reference numerals as compared to FIGS. 12 to 15. The housing 101' has a pair of vertical chambers 103' and 105' each containing a coil spring 107' and 109' respectively. A clip member 111' has an arcuate proximal portion 113' that fits over a peripheral surface 12 of a wheel rim 1, a pair of distal feet 115' and 117' that support coil springs 107 109' respectively, and a vertical portion 112'. The vertical portion 112' has a screw mounting plate 132 integral therewith mounted permanently at right angles to the vertical portion 112'. By turning down on screw 123' into nut 125', the entire clip member 111' moves downwardly to compress coil springs 107' and 109' as seen in FIG. 18. This causes the arcuate proximal portion 113' to firmly grip surface 12 on wheel 1 as seen in FIG. 19.

Figures 16, 17:
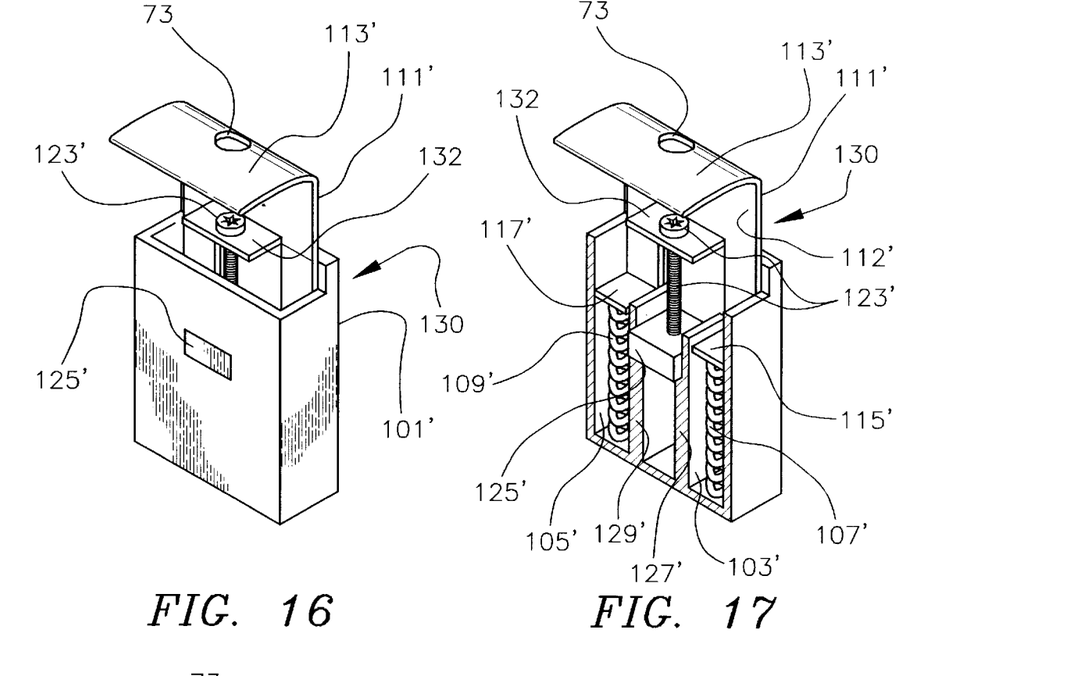
FIG. 16 shows a clip of a second alternate type in accordance with the teaching of the present invention.
FIG. 17 shows a clip of the second alternate type with its front cover removed in a resting mode.

As should be understood from FIGS. 16–18 and the explanation set forth above, when a tool end (not shown) is received within the recess 73 to rotate the screw 123' in one direction, it causes the clip member 111' to move downwardly in the view of FIG. 18 whereas rotation in the opposite direction causes the clip member 111' to move upwardly in the view of FIG. 17.

As should now be understood, when viewing FIGS. 16 to 18 and considering the clip 111' in the view of FIG. 17, rotations of the screw 123' causes the clip member 111' to move downwardly in the view of FIG. 18 causing the proximal end 113' thereof to lock over the surface 12 of the wheel 1 whereas reciprocation of the clip member 111' upwardly in the view of FIG. 17 will cause the proximal end 113' to be released from a locking configuration over the surface 12 of the wheel 1.

As should now be understood from the detailed description of the alternate clips 100 and 130, the clips 100 easily may be snapped over a peripheral surface 12 of a wheel while the clips 130 may be operated in the manner described above to reciprocate their clip members 111' to a locked configuration over a peripheral surface of a wheel. Thus, it is preferable that the clips 130 be used in diametrically opposed pairs so that those pairs of clips 130 may be operated to positively and strongly clamp over a peripheral surface of a wheel to strongly lock a wheel cover thereon.

Figure 20:
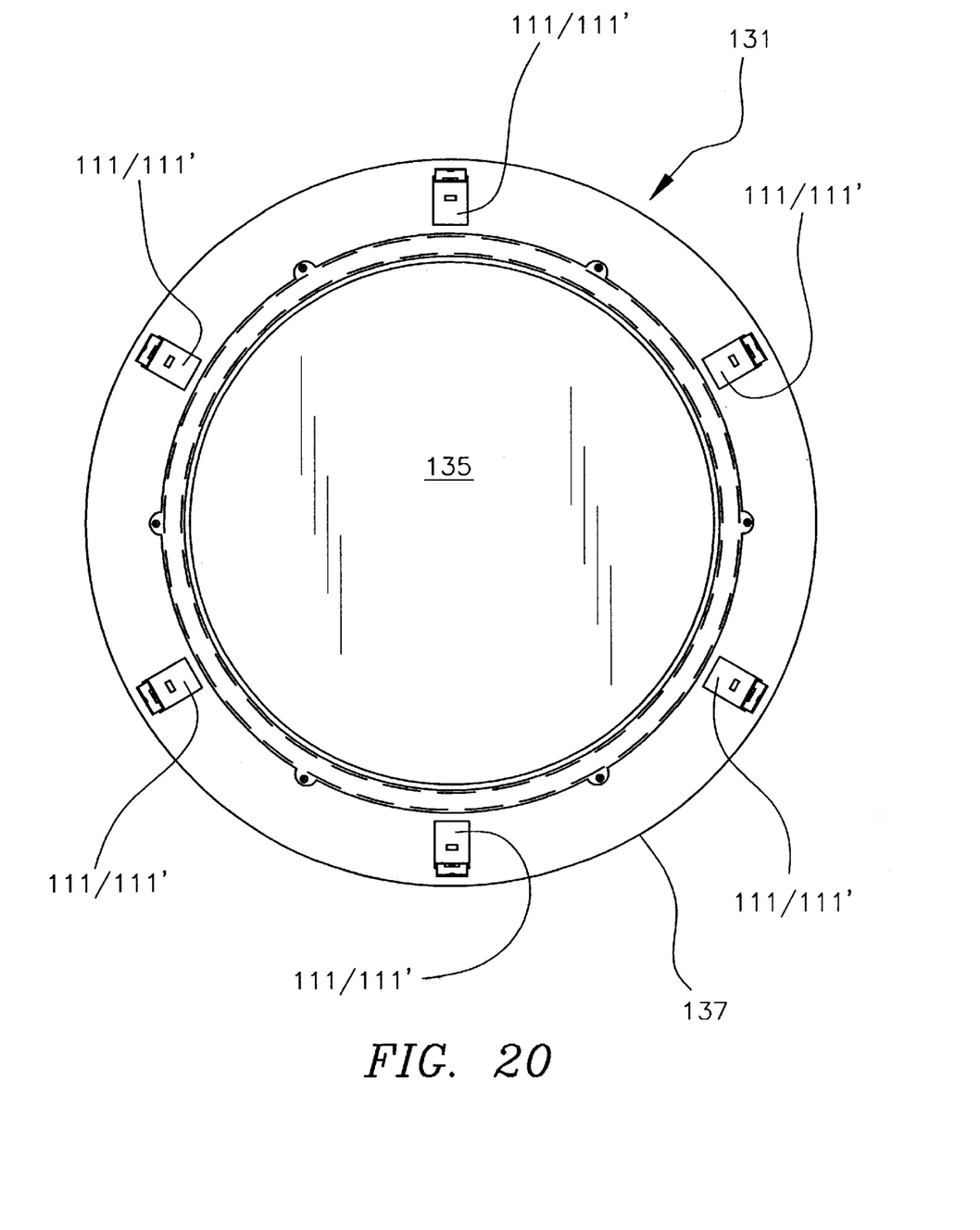
FIG. 20 shows a rear view of a wheel cover with six clips of the type shown in FIGS. 13 or 17.

FIG. 20 shows a wheel cover 131 having attached the clips members 111 or 111' of the present invention. The wheel cover 131 includes a periphery 137 as well as a central portion 135 that may be flat or domed as desired. The teachings described herein with reference to FIG. 20 is equally applicable to the use of a wheel ring rather than a wheel cover.

Accordingly, as described hereinabove in the embodiments of the present invention, where clips 100 or 130 are employed, the user may easily adapt a particular wheel cover to wheels of differing shapes and configurations so long as the differences between them are within the tolerances of the distances that the various clip members' arcuate proximal portion may move.

As such, an invention has been disclosed in terms of preferred embodiments thereof which fulfill each and every one of the objects of the invention as set forth hereinabove and provide a new and useful universal mount for tire rims of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A wheel cover or wheel ring including a surface adapted to cover a portion of a vehicle wheel rim comprising a universal mount adapted to mount said wheel cover or wheel ring on vehicle wheels of differing configurations, comprising:

a) a plurality of spaced apart clips mounted about an inside periphery of said wheel cover or wheel ring;
   b) each of the clips including:
      i) a housing permanently mounted on said wheel cover or wheel ring and including a pair of spaced apart vertical internal chambers each containing a resilient member;
      ii) a threaded screw threaded to a nut mounted between the pair of vertical internal chambers;
      iii) a movable clip member having a proximal end, a distal end and a vertical wall connecting the proximal end and distal end, the distal end having a pair of feet each engaging an end of the resilient member, the proximal end being arcuate in shape to engage a peripheral surface of a wheel; and
      iv) means for compressing the resilient members while mounting each clip to the vehicle wheel rim.

2. The wheel cover or wheel ring according to claim 1 wherein each resilient member is a coil spring mounted above the pair of feet.

3. The wheel cover or wheel ring according to claim 1 wherein each resilient member is a coil spring mounted below the pair of feet.

4. The wheel cover or wheel ring according to claim 2 wherein the means for compressing the coil springs is an upper plate covering a top of the pair of vertical chambers, an engagement of the threaded screw with the upper plate at one end and the nut at a second end together with an upward movement of the movable clip member.

5. The wheel cover or wheel ring according to claim 3 wherein the means for compressing the coil springs is a screw mounting plate covering a top of an internal wall for the pair of vertical chambers, the screw mounting plate integral with and at a right angle to the vertical wall of the mobile clip member So that downward turning of the threaded screw compresses the coil springs.

\* \* \* \* \*